United States Patent

Kamiyama et al.

[11] Patent Number: 5,598,873
[45] Date of Patent: Feb. 4, 1997

[54] BRANCH PIPE LINING METHOD AND LINER

[75] Inventors: Takao Kamiyama, Hiratsuka; Yasuhiro Yokoshima, Ibaraki-ken; Shigeru Endoh, Kasukabe, all of Japan

[73] Assignees: Shonan Gosei-jushi Seisakusho K.K.; Yokoshima & Company; Get Inc., all of, Japan

[21] Appl. No.: 212,779

[22] Filed: Mar. 15, 1994

[30]      Foreign Application Priority Data

Mar. 23, 1993 [JP] Japan .................................. 5-063596

[51] Int. Cl.$^6$ .................................................. F16L 55/162
[52] U.S. Cl. ........................................... 138/98; 138/97
[58] Field of Search ................... 138/97, 98; 405/150.1; 156/287; 264/269

[56]            References Cited

U.S. PATENT DOCUMENTS

| | | | |
|---|---|---|---|
| 4,135,958 | 1/1979 | Wood | 138/97 |
| 4,758,454 | 7/1988 | Wood | 138/98 |
| 4,778,553 | 10/1988 | Wood | 138/98 |
| 4,883,557 | 11/1989 | Morinaga et al. | 138/98 |
| 5,223,204 | 6/1993 | Endoh | 138/97 |
| 5,280,811 | 1/1994 | Catallo et al. | 138/97 |
| 5,297,582 | 3/1994 | Kitajima et al. | 138/98 |
| 5,329,063 | 7/1994 | Endoh | 138/98 |
| 5,393,481 | 2/1995 | Wood | 156/287 |

Primary Examiner—David Scherbel
Assistant Examiner—James F. Hook
Attorney, Agent, or Firm— Whitham, Curtis, Whitham & McGinn

[57]              ABSTRACT

A branch pipe lining method is provided which can directly achieve an air-tight connection between a pressure bag and a branch pipe liner bag in a simple structure without employing a conventional sealed tube. An open end of the pressure bag is attached to a set nozzle attached to a work robot which is movably installed in a main pipe. A branch pipe liner bag, impregnated with a thermosetting resin, is placed inside the pressure bag. The liner bag has a flange which is removably attached to the set nozzle by fitting a protrusion formed on a surface of the flange into a concave groove formed in the set nozzle. With the flange being closely contacted to the inner wall of the main pipe around a branch pipe opening, compressed air is supplied into the pressure bag to evert and insert the branch pipe liner bag into a branch pipe. While the branch pipe liner bag is pressed against the inner wall of the branch pipe, the thermosetting resin impregnated in the branch pipe liner bag is cured, whereby the inner wall of the branch pipe is lined with the cured thermosetting resin, i.e., the branch pipe is repaired. Upon completing the lining operation, the protrusion is disengaged from the concave groove to remove the work robot and the pressure bag from the branch pipe liner bag.

8 Claims, 8 Drawing Sheets

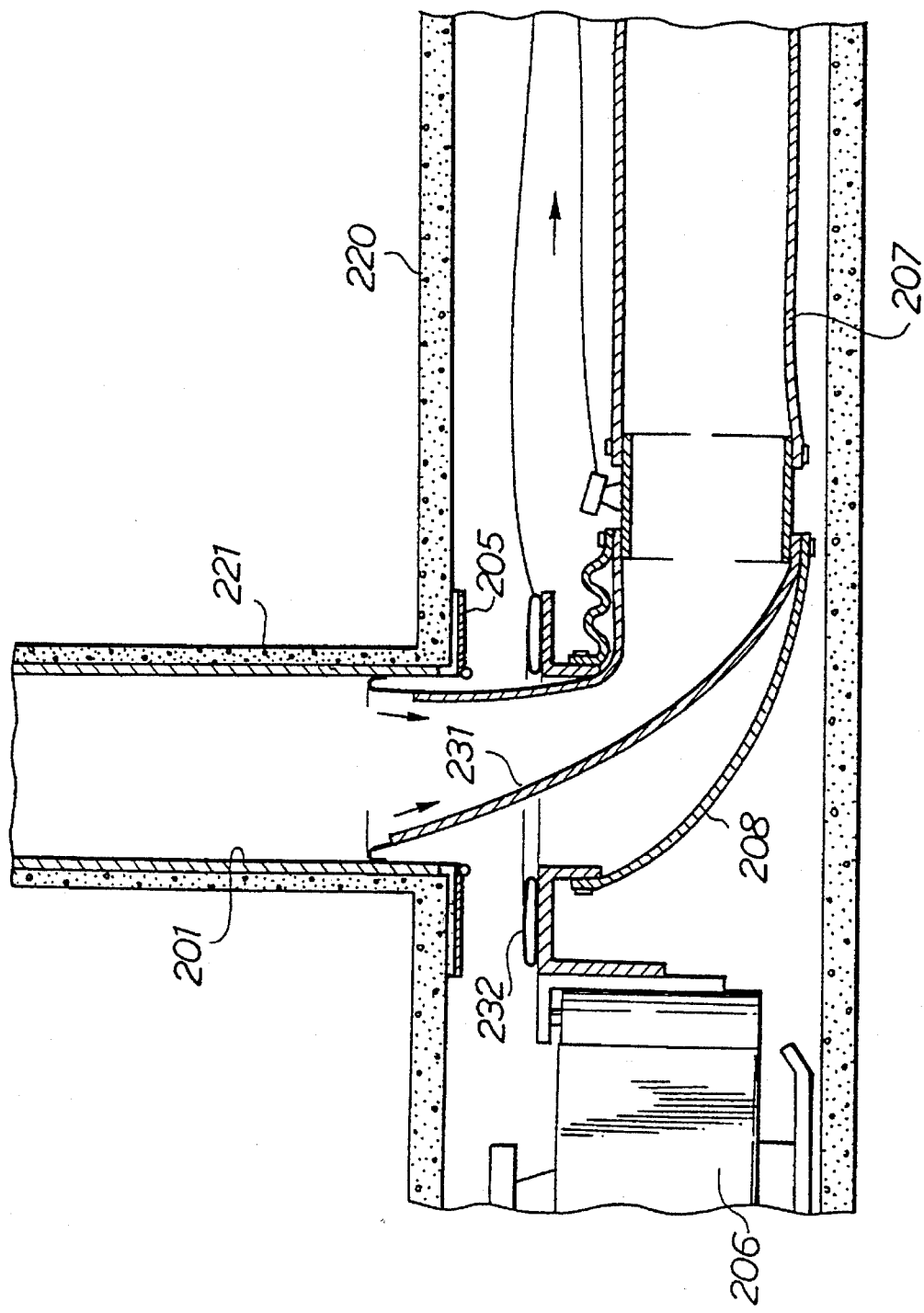

BRANCH PIPE LINING METHOD AND LINER

BACKGROUND OF THE INVENTION

1. Field of the Invention

The present invention relates to a method and for lining a pipe by applying a liner bag on the inner wall of the pipe, and in particular to a method for lining a branch pipe branching off a main pipe. The present invention also relates to a liner for use in such a branch pipe lining method.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to the method described in the above-mentioned publication, the pipe repair method comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of procedure shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

This method is applicable to a pipe branching out from a main pipe as well, and how it is conducted will be described next with reference to FIG. 7.

FIG. 7 is a cross-sectional view showing a conventional method for lining a branch pipe. A pressure bag 107 is inserted into a main pipe 120. Since this pressure bag 107 must be separated from a branch pipe liner bag 101, a sealed tube 111 must be connected to the pressure bag 107 for applying a pressure to the branch pipe liner bag 101.

Then, compressed air or the like is supplied into the pressure bag 107. The sealed tube 111 and the branch pipe liner bag 101 are everted in a branch pipe 121, and the branch pipe liner bag 101 is heated to harden a hardenable resin impregnated therein while the illustrated state is held unchanged. Thereafter, when the sealed tube 111 is pulled out from the branch pipe 121 (branch pipe liner bag 101), the branch pipe has been lined by the hardened branch pipe liner bag 101. Thus, the inner wall of the branch pipe 121 is repaired.

With the above-mentioned conventional method, however, sealed tubes of proper lengths must be prepared depending upon variations in length of branch pipes every time a repair operation is required, wherein a problem arises that the sealed tube must be exchanged such that a suitable length is provided for a branch pipe to be repaired. Additionally, if a steeply angled bent portion is included in a branch pipe, the sealed tube may be caught by the bent portion to prevent the same from being extracted from the branch pipe.

To overcome the above-mentioned problems, a method for lining a branch pipe as shown in FIGS. 8 and 9 has been proposed (in Japanese Patent Application No. 3-156096). This method will hereinafter be described with reference to these drawings.

As shown in FIG. 8, a work robot 206 is introduced into a main pipe 220, and a set nozzle 211 of the work robot 206 and a pressure bag 207 is connected by a guide tube 208. Inside the guide tube 208, there is arranged a peel-back tube 231 which enables an air-tight connection between the pressure bag 207 and the branch pipe liner bag 201. More specifically, one end of the peel-back pipe 231 is attached to the pressure bag 207, while the other end of the same is temporarily adhered to the inner wall of the branch pipe liner bag 201 such that the peel-back pipe 231 may be easily detached therefrom after the repair operation is completed.

After a flange 205 of the branch pipe liner bag 201 is positioned at a peripheral edge of an opening formed through the branch pipe 221, when a compressor, not shown, is driven to supply compressed air to the pressure bag 207 and an air mat 232, the air mat 232 is inflated as shown in FIG. 8 to cause the flange 105 of the branch pipe liner bag 201 to tightly contact with the peripheral edge of the opening in the branch pipe 221. The branch pipe liner bag 201 located inside the pressure bag 207, receiving the pressure of the compressed air supplied into the pressure bag 207, is gradually everted and inserted into the branch pipe 221 in the direction indicated by the white arrow in the drawing.

When the eversion and insertion of the branch pipe liner bag 201 into the branch pipe 221 have been completed, a cap 233 is attached to an open end of the branch pipe liner bag 201, as shown in FIG. 9, to which an air hose 234 is connected to supply compressed air into the branch pipe liner bag 201, whereby the branch pipe liner bag 201 is pressed against the inner wall of the branch pipe 221. In this state, when a pump 235 is driven to inject hot water stored in a tank 236 into the branch pipe liner bag 201 through a hot water hose 237, the hot water provides heat to a thermosetting resin impregnated in the branch pipe liner bag 201 to cause the same to be cured. In this manner, the inner wall of the branch pipe 221 is lined with the cured branch pipe liner bag 201, thus completing the repair operation of the branch pipe 221.

After the branch pipe 221 has been lined as described above, hot water within the branch pipe liner bag 201 is extracted, and the pressure bag is moved in the direction indicated by the arrows in FIG. 10. Then, since the pressure bag 207 and the work robot 206 are coupled through the guide tube 208, the work robot 206 is also moved together with the pressure bag 207, whereby the peel-back tube 231 temporarily adhered to the branch pipe liner bag 201 is peeled off from the temporarily adhered portion and then moved inside the main pipe 220 together with the pressure bag 207 and so on.

According to the method for lining a branch pipe as described above, since the air-tight connection between the pressure bag 207 and the branch pipe liner bag 201 is achieved by the peel-back tube 231, this method is advantageous in that the same peel-back tube 231 may be used for branch pipes of any length; the conventionally employed sealed tube 111 (see FIG. 7) can be removed; and steeply sloped, long, or largely curved branch pipes may be efficiently lined in a similar manner.

However, with the foregoing method for lining a branch pipe, when the peel-back tube 231 is peeled off from the branch pipe liner bag 201 as shown in FIG. 10, the temporarily adhered portion of the peel-back tube 231 may not be peeled and remain in the branch pipe liner bag 201, and the remaining portion may hinder a fluid from flowing inside the branch pipe 221.

OBJECT AND SUMMARY OF THE INVENTION

The present invention has been made in view of the above-mentioned problem, and its object is to provide a method for lining a branch pipe which is capable of achieving in a simple structure a direct air-tight connection between a pressure bag and a branch pipe liner bag without employing the conventionally required sealed tube.

To achieve the above object, the present invention provides a method for lining a branch pipe branching off a main pipe comprising the steps of: (a) attaching an open end of a pressure bag to a set nozzle attached to a work robot which is movably introduced in the main pipe; (b) placing in the pressure bag a branch pipe liner bag impregnated with a thermosetting resin and having a flange at one end thereof; (c) pulling out one end of the branch pipe liner bag at the flange side from the pressure bag and everting the branch pipe liner bag; (d) removably engaging the flange with the set nozzle in concave-convex relationship; (e) supplying a pressurized fluid into the pressure bag with the flange being closely contacted to the inner wall of the main pipe around the perimeter of a branch pipe opening to evert and insert the branch pipe liner bag into the branch pipe; (f) curing the thermosetting resin impregnated in the branch pipe liner bag, the branch pipe liner bag being left pressed against the inner wall of the branch pipe; and (g) disengaging the flange from the set nozzle and removing the work robot and the pressure bag from the branch pipe liner bag.

In another aspect of the present invention, there is also provided a liner for lining a branch pipe comprising: a pressure bag having an open end connected to a set nozzle coupled to a work robot placed inside a main pipe from which the branch pipe is branched off, the set nozzle having a groove on the upper surface thereof; a branch pipe liner bag impregnated with a thermosetting resin, placed inside the pressure bag; a flange coupled to one end of the branch pipe liner bag and having a protrusion on the lower surface thereof, wherein the flange is removably engaged with the set nozzle by inserting the protrusion of the flange into the groove formed in the set nozzle.

According to the branch pipe lining method of the present invention, since an air-tight connection between the pressure bag and the branch pipe liner bag is directly achieved by concave-convex engagement of the flange of the branch pipe liner bag with the set nozzle, a peel-back tube required for conventional lining methods is made unnecessary, whereby the lining can be more easily performed as compared with the prior art.

When the lining is completed foe a branch pipe, the flange of the branch pipe liner bag is disengaged from the set nozzle to easily separate them from each other, so that the pressure bag and the work robot can be easily removed from the branch pipe liner bag. Since no peel-back tube is employed, the lining method of the present invention is free from the aforementioned problem inherent to the peel-back tube which may not be peeled favorably and partially remains inside the pipe.

Further, the provision of sealing members such as a packing material, an O-ring and so on in a fitting portion of the flange and the set nozzle permits a more reliable air-tight connection between the pressure bag and the branch pipe liner bag, thus allowing the branch pipe liner bag to be stably inserted in a branch pipe. Also, a bonding agent, if filled in the fitting portion, will further reinforce the air-tight connection.

The above and other objects, advantages and features of the invention will appear more fully hereinafter in the following description given in connection with the accompanying drawings and the novelty thereof pointed out in the appended claims.

BRIEF DESCRIPTION OF THE DRAWINGS

FIGS. 7 through 10 are cross-sectional views respectively showing a conventional branch pipe lining method.

DESCRIPTION OF THE PREFERRED EMBODIMENTS

One embodiment of the present invention will hereinafter be described with reference to the accompanying drawings.

Figure 1:
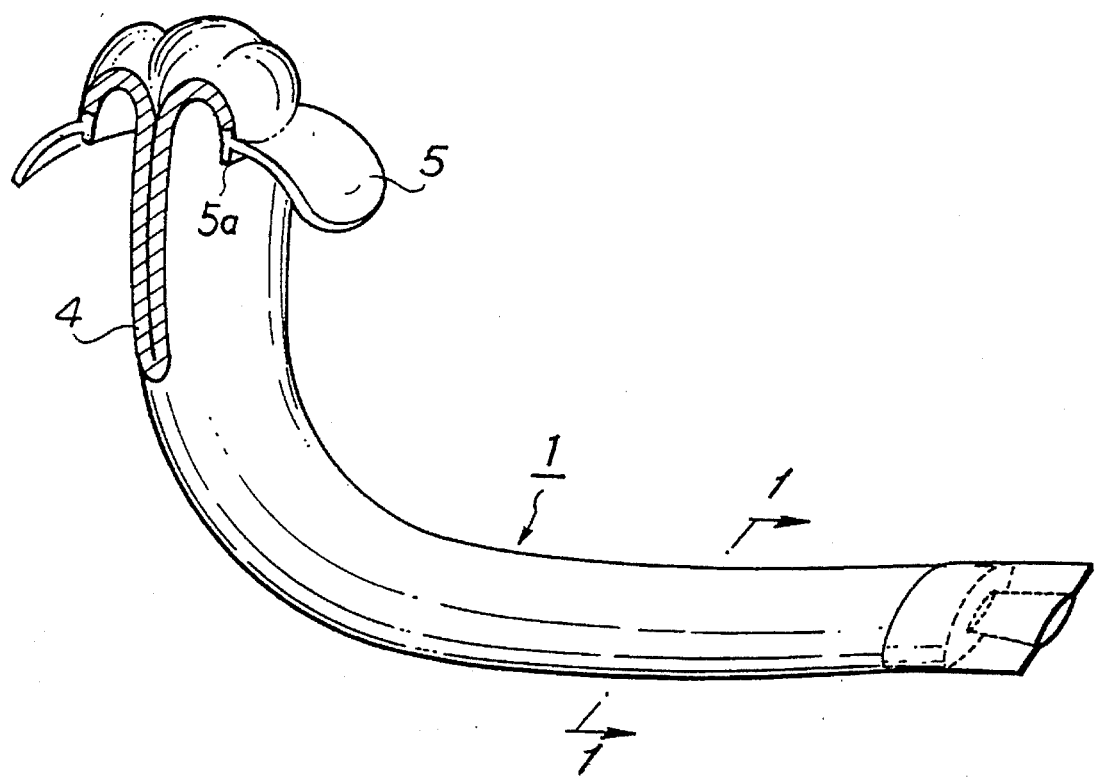
FIG. 1 shows a perspective view of a branch pipe liner bag used for the branch pipe lining method of the present invention with part thereof being exploded for explanation.
Figure 2:
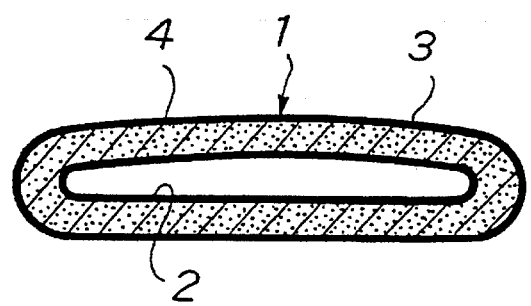
FIG. 2 is an enlarged cross-sectional view taken along a line A—A of FIG. 1.

FIG. 1 shows a perspective view of a branch pipe liner bag used for the branch pipe lining method of the present invention, wherein part thereof is exploded for illustrating the structure thereof; and FIG. 2 is an enlarged cross-sectional view taken along a line A—A of FIG. 1.

A branch pipe liner bag 1 shown in FIG. 1 has a tubular pipe liner bag 4 made of nonwoven fabric such as polyester, polypropylene, acrylic resin or the like, the outer surface of which is coated with highly air-tight plastic films 2 and 3 (see FIG. 2). The tubular pipe liner bag 4 is impregnated with a thermosetting resin. The plastic films 2, 3 may be made of polyurethane, polyethylene, polyethylene/nylon copolymer, or polyvinyl chloride resin.

The tubular pipe liner bag 4 to be inserted in the branch pipe 3 has its tail end closed, and the front end everted outwardly to form a flange 5 which is formed in an arcuate shape with a curvature equal to that of a main pipe 3 (see FIG. 3), later referred to. Over the whole inner perimeter of the lower surface of the flange 5, there is formed a protrusion 5*a* in a ring shape. It should be noted that the outer diameter of the branch pipe liner bag 1 is selected to be larger than the inner diameter of a branch pipe 21 (see FIG. 3), later referred to, such that the flange 5 can maintain its shape by the hardening of the thermosetting resin impregnated therein.

Figure 3:
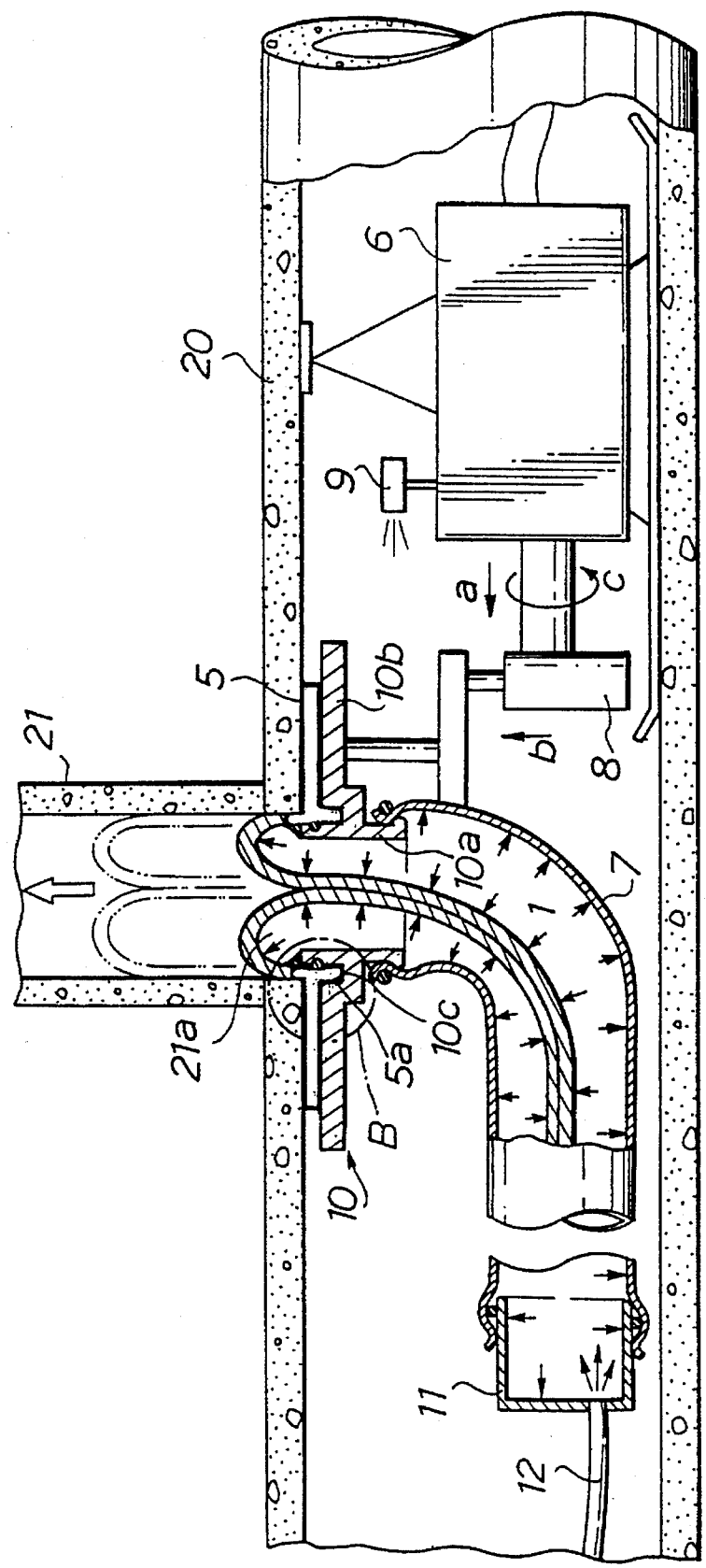
FIGS. 3 through 5 are cross-sectional views respectively showing a process of the branch pipe lining method of the present invention in order.

The branch pipe lining method by use of the branch pipe liner bag 1 according to the present invention will now be described with reference to FIGS. 3 through 6. FIGS. 2–5 are cross-sectional views showing the branch pipe lining method in the order of processes, and FIG. 3 is an enlarged view of a portion B indicated in FIG. 6.

Referring first to FIG. 3, a main pipe 20 has a branch pipe 21, branched off therefrom, which has a diameter smaller than that of the main pipe 20. As can be seen, there have already been installed, inside the main pipe 20, a work robot 6, a pressure bag 7, the branch pipe liner bag 1 and so on which had previously been assembled and integrated on the ground.

The work robot 6 is hydraulically driven so as to direct a head thereof 8 in the directions indicated by the arrows a and b in FIG. 3 as well as rotate the same in the direction indicated by the arrow c. A TV camera 9 is mounted on the work robot 6 for monitoring the movement of the head 8.

A set nozzle 10 is supported on the head 8 of the work robot 6. The set nozzle 10 has a cylindrical portion 10*a* and a flange portion 10*b*. In the upper surface of the flange portion 10*b*, a concave groove 10*c* is formed over the entire perimeter of the surface along the outer wall of the cylindrical portion 10*a*. This structure is illustrated in greater detail in FIG. 6.

The pressure bag 7 has one end thereof closed by a cap 11 and the other end forming an opening to is attached is the outer periphery of the cylinder portion 10*a* of the set nozzle 10, as shown in FIG. 3. Then, the pressure bag 7 is connected to a compressor installed on the ground, not shown, through an air hose 12 coupled to the cap 11.

Figure 6:
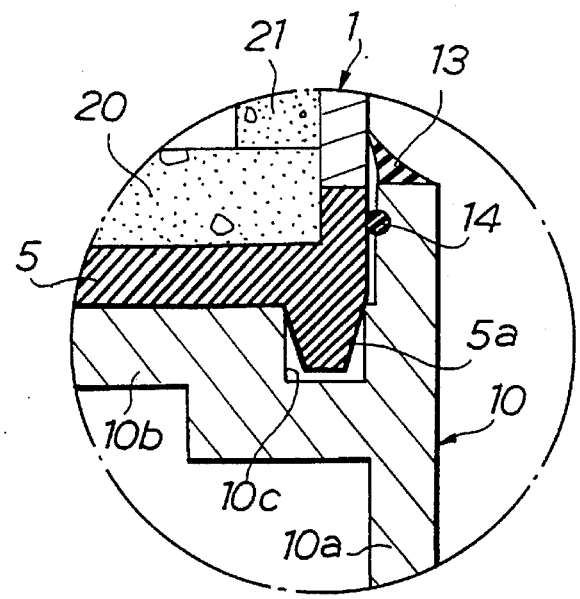
FIG. 6 is an enlarged view of a portion B in FIG. 5.
Figure 7:
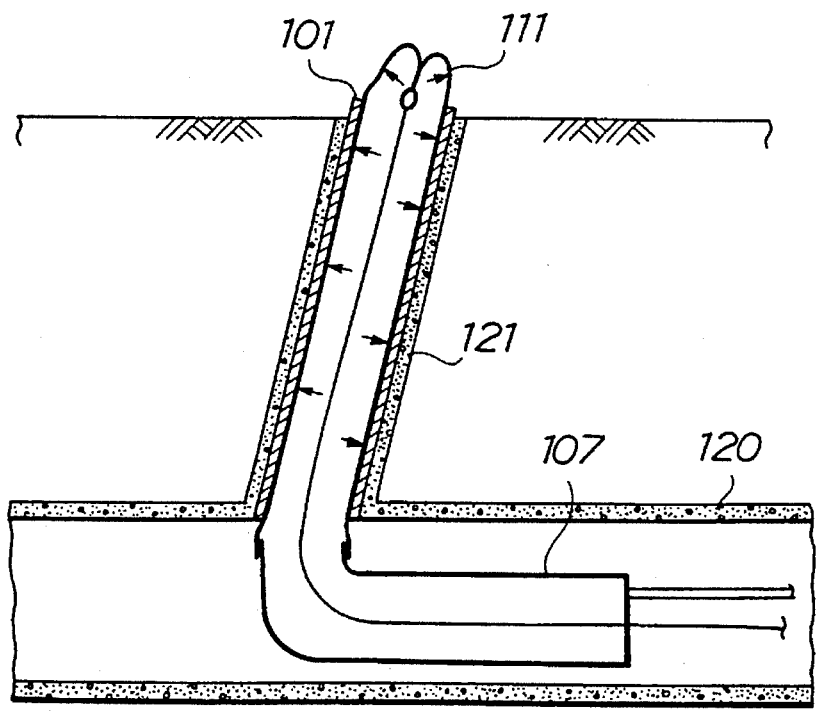
Figure 8:
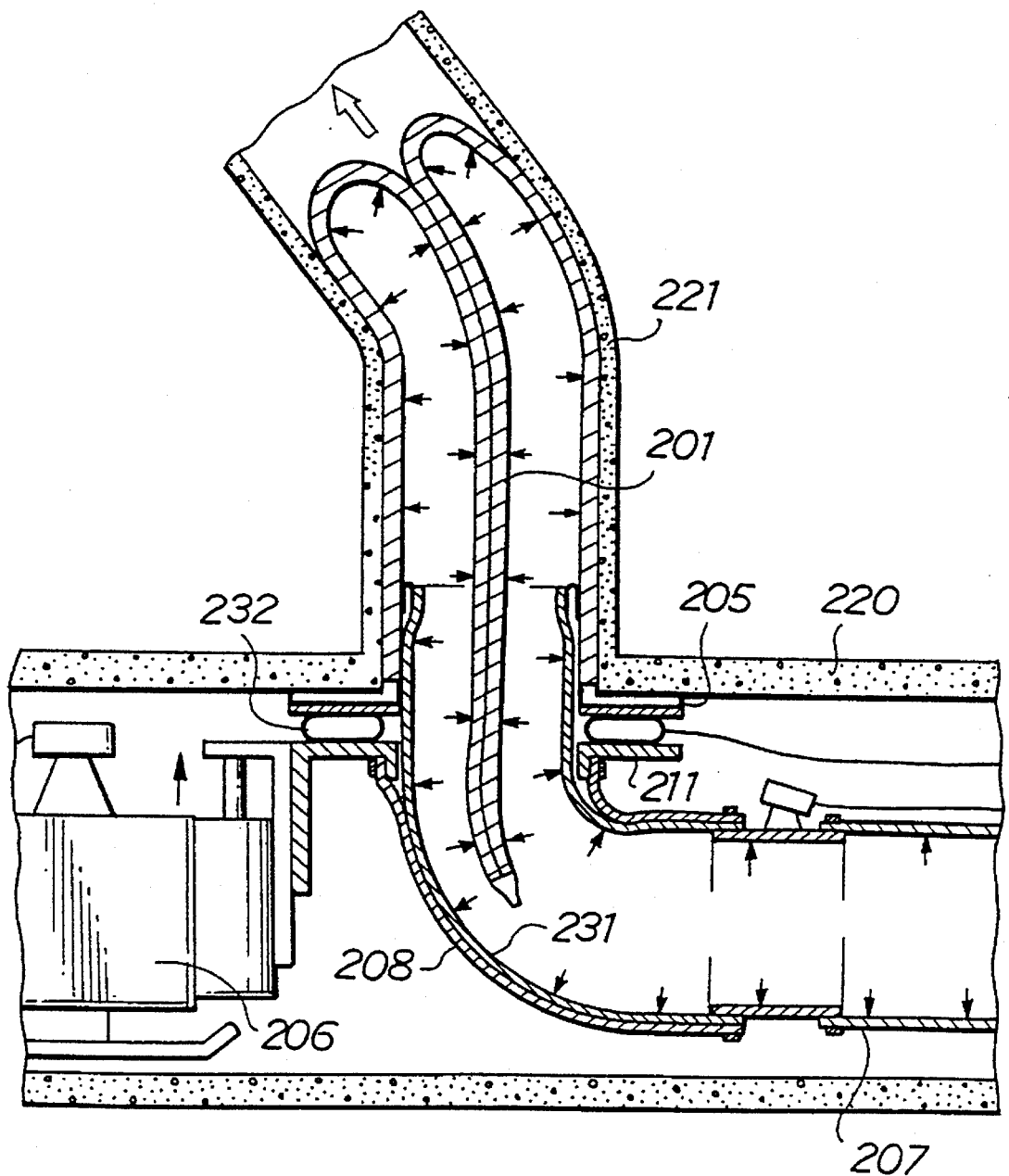
Figure 9:
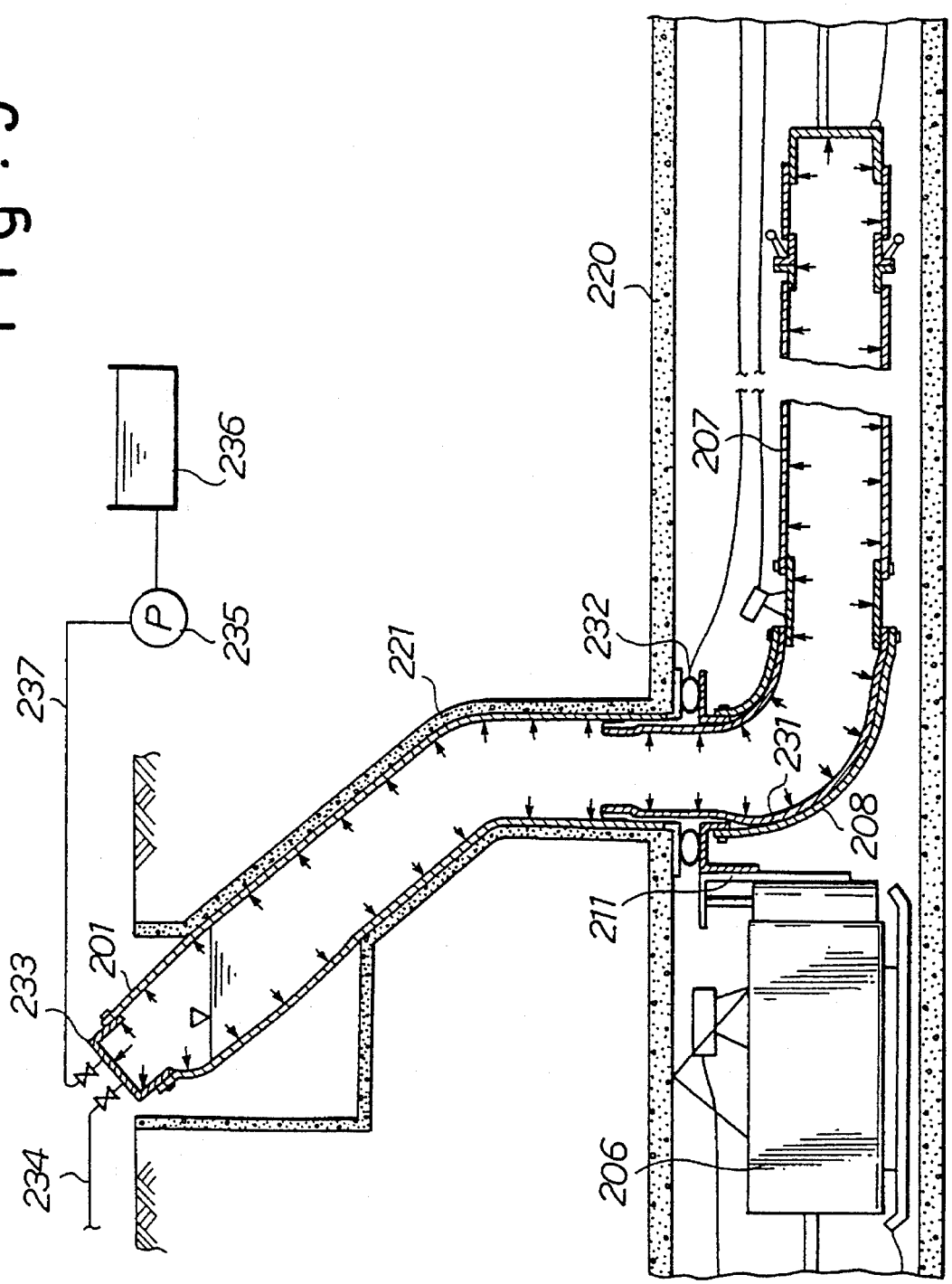

The aforementioned protrusion 5*a* protruding from the lower surface along the perimeter of the flange 5 at the end of the branch pipe liner bag 5, as shown in detail in FIG. 6, is tapered in the downward direction so as to allow the protrusion 5*a* to be more tightly inserted into the concave groove 10*c* formed in the upper surface of the set nozzle 10. Further, a ring-shaped packing material 13 and an O-ring 14 are arranged on the upper end of the cylindrical portion 10*a* of the set nozzle 10 and around the inner periphery of the cylindrical portion 10*a* near the upper end, respectively. When the protrusion 5*a* of the flange 5 is inserted into the concave groove 10*a* of the set nozzle 10 as illustrated, a highly air-tight condition is ensured for the fitting structure between the protrusion 5*a* and the concave groove 10*c* by sealing effects produced by the packing material 13 and the O-ring 14. It will be useful to note that a higher air-tight condition may be provided for the above-mentioned structure if a silicon-based bonding agent, for example, is filled in the concave groove 10*c* of the set nozzle 10.

As described above, the branch pipe liner bag 1 has the flange 5 thereof removably attached to the set nozzle 10 by means of the insertion of the protrusion 5*a* into the concave groove 10*c* of the set nozzle 10, while the air-tight connection between the branch pipe liner bag 1 and the pressure bag 7 is simply accomplished directly by the protrusion 5*a* and the concave groove 10*c* which are engaged in a concave-convex relationship. The remaining uneverted portion except for the flange 5 of the branch pipe liner bag 1 is placed inside the pressure bag 7 as shown in FIG. 3.

The attachment of the pressure bag 7 to the set nozzle 10, attachment of the flange 5 of the branch pipe liner bag 1 to the set nozzle 10, and so on as explained above, have previously been done on the ground such that the assembly of the integrated branch pipe liner bag 1, work robot 6 and pressure bag 7 are introduced as an integrated unit into the main pipe 20 as shown in FIG. 3.

Once the assembly is placed inside the main pipe 20, the situation within the main pipe 20 may be monitored on the ground by the TV camera 9 mounted on the work robot 6. After the flange 5 of the branch pipe liner bag 1 is positioned at an opening 21*a* of the branch pipe 21, the head 8 of the work robot 6 is moved in the direction indicated by the arrow b in FIG. 3 (upward direction) to press the flange 5 of the branch pipe liner bag 1 against the inner wall of the main pipe 20 around the perimeter of the branch pipe opening 21*a* such that the flange 5 is closely contacted with the inner wall of the main pipe 20 as illustrated.

Next, a compressor installed on the ground, not shown, is driven to supply compressed air into the pressure bag 7 through the air hose 15 to cause the branch pipe liner bag 1, receiving the pressure of the compressed air, to be everted and go forward inside the branch pipe 21 in the direction indicated by the white arrow. In this event, the air-tight connection between the branch pipe liner bag 1 and the pressure bag 7 is achieved by the protrusion 5*a* of the flange 5 and the concave groove 10*c* of the set nozzle 10 which are engaged in concave-convex relationship. This air-tight connection may be further reinforced by a sealing effect of the packing material 13 and the O-ring 14 and moreover by a sealing effect of the bonding agent filled in the concave groove 10 (see FIG. 6), which allows the branch pipe liner bag 1 to be stably inserted into the branch pipe 21. Also, since the tubular pipe liner bag 4 of the branch pipe liner bag 1 has the outer wall covered with the highly air-tight plastic films 2, 3 (before the branch pipe is everted), even if the branch pipe 21 is arranged at a rather steep angle with the main pipe 20, the thermosetting resin impregnated in the tubular pipe liner bag 4 never flow down.

Figure 4:
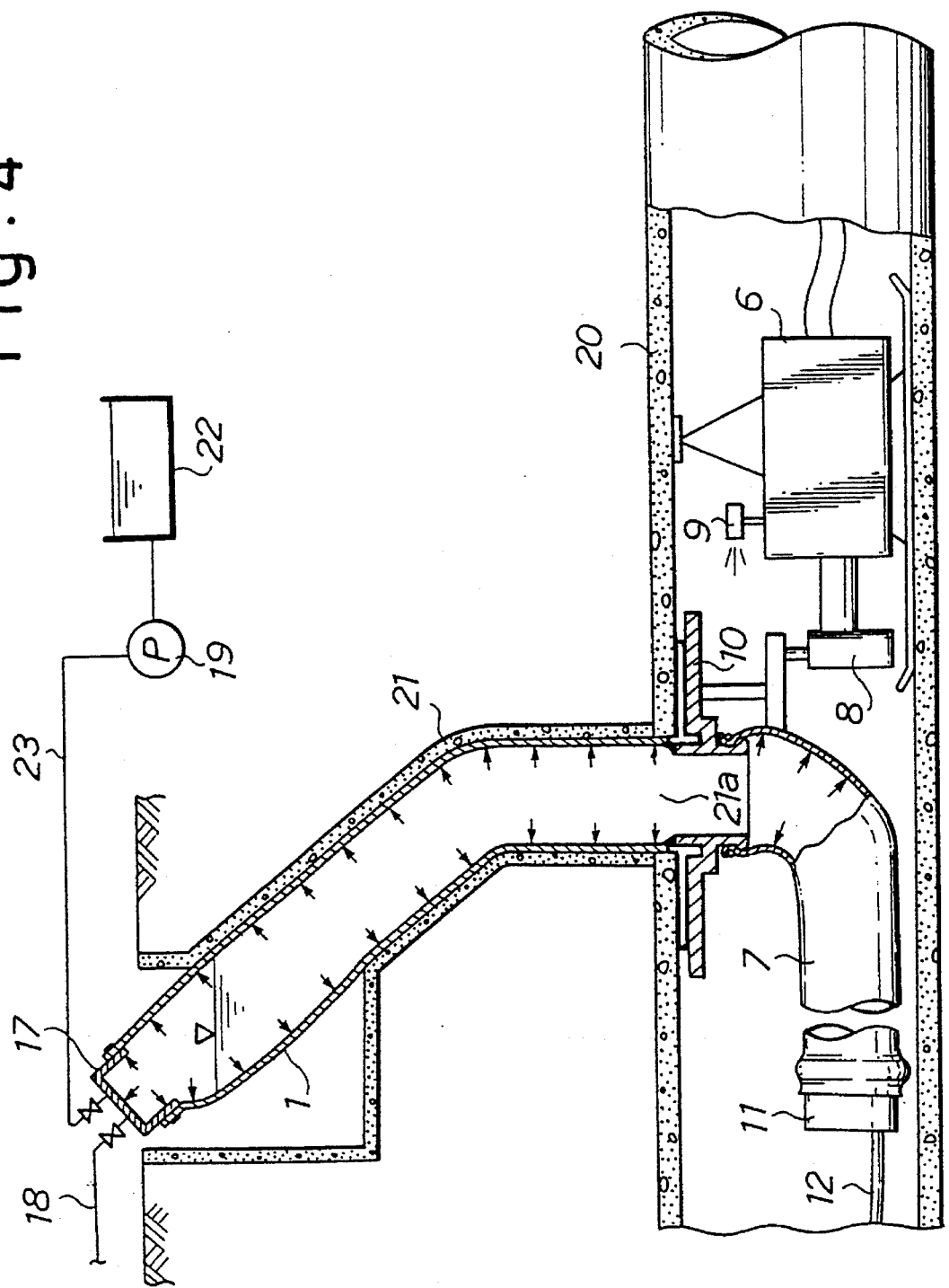

When the eversion and insertion of the branch pipe liner bag 1 into the branch pipe 21 has been completed, a cap 17 is attached to the open end of the branch pipe liner bag 1 as shown in FIG. 4. Compressed air is then supplied into the branch pipe liner bag 1 from an air hose 18 connected to the cap 17 to press the branch pipe liner bag 1 against the inner wall of the branch pipe 21. In this state, when a pump 19 is driven to inject hot water in a tank 22 into the branch pipe liner bag 1 through a hot water hose 23, the thermosetting resin impregnated in the branch pipe liner bag 1 is heated and accordingly cured, with the result that the branch pipe 21 is repaired by means of the cured branch pipe liner 1 which has been lined on the inner wall thereof.

Figure 5:
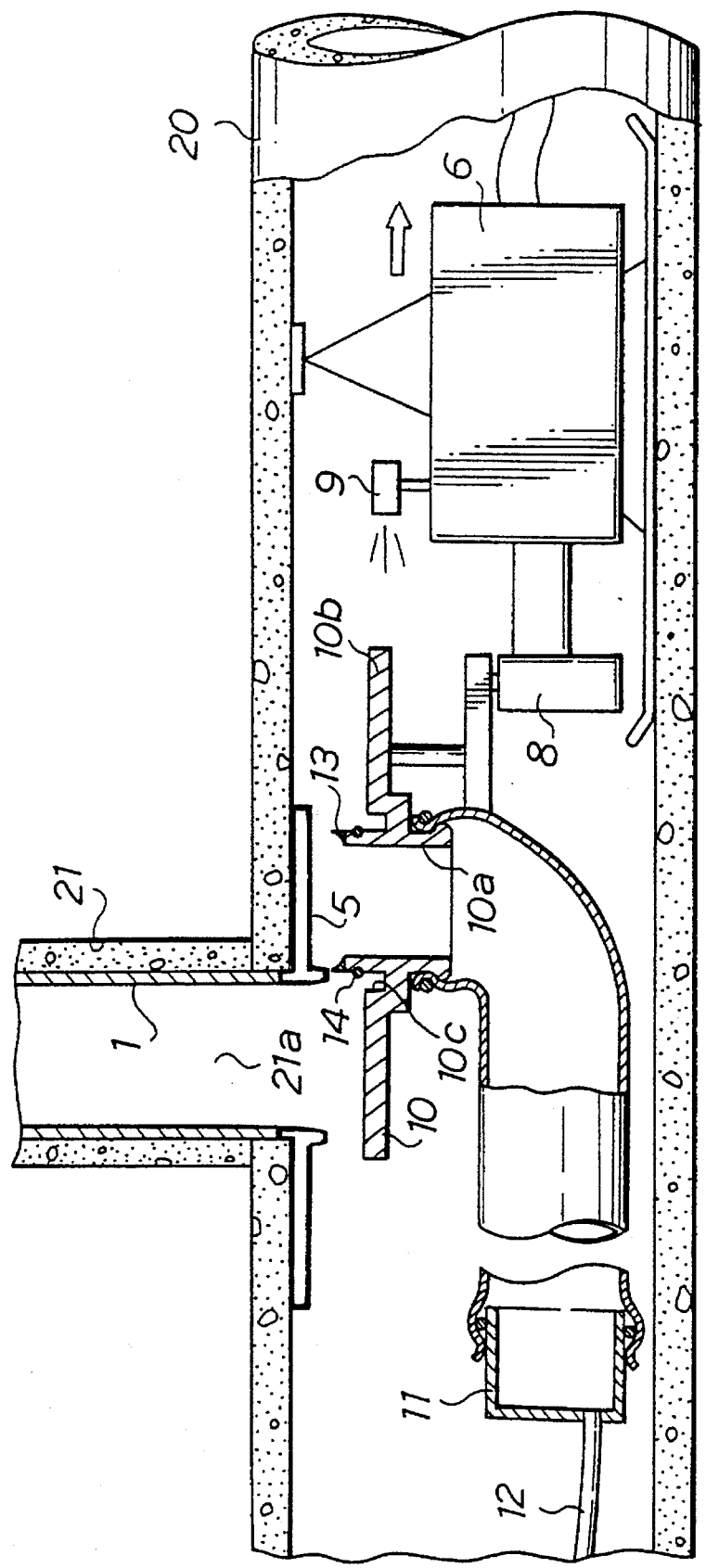

When the branch pipe 21 has been lined as described above, hot water inside the branch pipe liner bag 1 is extracted. Then, when the head 8 of the work robot 6 is lowered as shown in FIG. 5, the set nozzle 10 is readily detached from the branch pipe liner bag 1 since the set nozzle 10 has been removably attached to the branch pipe liner bag 1 by insertion of the protrusion 5*a* of the flange 5 into the concave groove 10*c* of the set nozzle 10. Thus, the movement of the work robot 6 in the direction indicated by the arrow in FIG. 5 (rightward direction in the drawing) will cause the pressure bag 7 attached to the set nozzle 10 to move together with the work robot 6 in the same direction to the outside of the main pipe 20, thus completing the lining operation for the branch pipe 21.

When the lining operation has been completed for the branch pipe 21 as described above, the set nozzle 10 and the work robot 6 can be removed easily from the branch pipe liner bag 1. This effectively avoids the aforementioned inconvenience inherent in the prior art method that part of a peel-back tube may be left unpeeled inside the branch pipe liner bag.

According to the present embodiment as described above, the air-tight connection between the pressure bag 7 and the branch pipe liner bag 1 is directly achieved by the protrusion 5*a* of the flange 5 and the concave groove 10*c* of the set nozzle 10 which are engaged in concave-convex relationship. Further, since the pressure bag 7 and the branch pipe liner bag 1 may be easily detached after the lining operation is completed for the branch pipe 21, a peel-back tube required by the conventional lining method is made unnecessary, with the result that the branch pipe 21 can be more easily lined.

As can be clearly understood from the foregoing description, according to the present invention, the open end of the pressure bag is connected to the set nozzle attached to the work robot which is movably introduced in the main pipe. The pressure bag is provided inside thereof with the branch pipe liner bag impregnated with a thermosetting resin and having a flange at one end. One end of the branch pipe liner bag on the flange side is pulled out from the pressure bag and everted. The flange is removably engaged with the set nozzle in concave-convex relationship such that the flange is closely contacted to the inner wall of the main pipe around the perimeter of the branch pipe opening. In this state, a pressured fluid is supplied into the pressure bag to cause the branch pipe liner bag to be everted and inserted into the branch pipe. With the branch pipe liner bag being left pressed against the inner wall of the branch pipe, the thermosetting resin impregnated in the branch pipe liner bag is cured by supplying hot water into the pressure bag. Then, after extracting the hot water from the pressure bag, the flange is disengaged from the set nozzle, and the work robot and the pressure bag are separated from the branch pipe liner bag. It will be appreciated that this method allows a direct air-tight connection between the pressure bag and the branch pipe liner bag to be made in a simple structure without employing a conventionally required sealed tube, so that the branch pipe can be more easily lined.

While the invention has been described in its preferred embodiment, it is to be understood that modifications will occur to those skilled in the art without departing from the spirit of the invention. For instance, the thermosetting resin may be replaced by another hardenable resin such as thermosetting resin. The scope of the invention is therefore to be determined solely by the appended claims.

What is claimed is:

1. A method for lining a branch pipe branching off a main pipe comprising the steps of:
   (a) attaching an open end of a pressure bag to a set nozzle attached to a work robot which is movably introduced in the main pipe, said set nozzle having a cylindrical portion and a flange portion, an upper surface of said flange portion having a concave groove in said flange along an outer wall of said cylindrical portion;
   (b) placing a branch pipe liner bag impregnated with a thermosetting resin in a pressure bag attached to said work robot, said branch pipe liner bag having a flange at one end thereof, said flange having a protrusion in a ring shape over an inner perimeter of a lower surface thereof;
   (c) pulling out said flange of said branch pipe liner bag from said pressure bag;
   (d) removably engaging said flange of the branch pipe liner bag with said set nozzle in concave-convex relationship such that said protrusion of said flange is inserted in said groove of said set nozzle to form a seal between said branch pipe liner bag and said set nozzle;
   (e) supplying a pressurized fluid into said pressure bag with said flange being closely contacted to an inner wall of the main pipe around a perimeter of a branch pipe opening to evert and insert said branch pipe liner bag into the branch pipe;
   (f) curing the thermosetting resin impregnated in said branch pipe liner bag while said branch pipe liner bag being is pressed against an inner wall of the branch pipe; and
   (g) disengaging said flange from said set nozzle and removing said work robot and said pressure bag from said main pipe.

2. A branch pipe lining method according to claim 1, including the step of arranging a sealing member is provided in an engaging portion between said set nozzle and said flange.

3. A branch pipe lining method according to claim 1, including the step of arranging a bonding agent in an engaging portion between said set nozzle and said flange.

4. A branch pipe lining method according to claim 3, wherein said bonding agent in said arranging step is an epoxy-based bonding agent.

5. A branch pipe lining method according to claim 1, wherein said step of curing the thermosetting resin includes a step of supplying hot water into said pressure bag and said thermosetting resin is cured by heat conducted from said hot water.

6. Apparatus liner for lining a branch pipe comprising:
   a pressure bag having an open end connected to a set nozzle coupled to a work robot placed inside a main pipe from which said branch pipe is branched off, said set nozzle having a groove on the upper surface thereof;
   a branch pipe liner bag impregnated with thermosetting resin, placed inside said pressure bag;
   a flange coupled to one end of said branch pipe liner bag and having a protrusion on the lower surface thereof,
   wherein said flange is removably engaged with said set nozzle by inserting said protrusion of said flange into said groove formed in said set nozzle to form a seal between said protrusion and said groove.

7. A set nozzle for lining a branch pipe branching off a main pipe, comprising a cylindrical portion and a flange portion, an upper surface of said flange portion having a concave annular groove means having opposed surfaces formed at a perimeter of a surface along an outer wall of said cylindrical portion for sealably receiving a protrusion formed on a flange formed on a pipe liner bag throughout said annular groove means to form a seal between said set nozzle and said pipe line bag independent of compression against an interior of a pipe.

8. A branch pipe liner bag for lining a branch pipe branching off a main pipe, comprising a flange at one end thereof, said flange having a protrusion means in a ring shape on a lower surface of said flange for removably sealing said pipe liner bag to a groove on a set nozzle.

\* \* \* \* \*